United States Patent [19]

Podolak et al.

[11] Patent Number: 4,899,146

[45] Date of Patent: Feb. 6, 1990

[54] METHOD OF AND APPARATUS FOR CONVERTING DIGITAL DATA BETWEEN DATA FORMATS

[75] Inventors: J. B. Podolak, Schaumburg; Ronald B. Saluski, Bolingbrook, both of Ill.

[73] Assignee: R. R. Donnelley & Sons Company, Chicago, Ill.

[21] Appl. No.: 285,092

[22] Filed: Dec. 16, 1988

Related U.S. Application Data

[62] Division of Ser. No. 44,238, Apr. 30, 1987, Pat. No. 4,816,829.

[51] Int. Cl.[4] .............................................. H03M 5/10
[52] U.S. Cl. ...................................... 341/51; 341/86; 341/122; 364/715.03
[58] Field of Search .................... 541/51, 69, 81, 86, 541/122, 132; 364/178, 179, 715.01, 715.02, 715.03, 724.01

[56] References Cited

U.S. PATENT DOCUMENTS

| | | | |
|---|---|---|---|
| 3,299,204 | 1/1967 | Cherry et al. | 178/6 |
| 3,324,237 | 6/1967 | Cherry et al. | 178/6 |
| 3,449,742 | 6/1969 | Stapleton | 341/155 |
| 4,308,585 | 12/1981 | Jordan | 364/520 |
| 4,348,699 | 9/1982 | Tsuchiya et al. | 360/32 |
| 4,370,643 | 1/1983 | Kitamura et al. | 341/123 |
| 4,568,912 | 2/1986 | Kitamura et al. | 341/122 |
| 4,644,545 | 2/1987 | Gershenson | 341/51 |
| 4,672,360 | 6/1987 | Bradley et al. | 364/715.01 |
| 4,673,916 | 6/1987 | Kitamura et al. | 341/110 |

*Primary Examiner*—William M. Shoop, Jr.
*Assistant Examiner*—Gary J. Romano
*Attorney, Agent, or Firm*—Wood, Dalton, Phillips, Mason & Rowe

[57] ABSTRACT

A method of and apparatus for converting between first and second digital data formats is disclosed whereby digital words of the first format are analyzed to detect an upper bandwidth limit of a corresponding analog signal in an interval thereof defined by such words and to determine the level of the analog signal at the beginning of such interval. A digital word of the second format is encoded with first and second pluralities of bits representing the determined upper bandwidth limit and the level of the corresponding analog signal at the beginning of the interval.

4 Claims, 6 Drawing Sheets

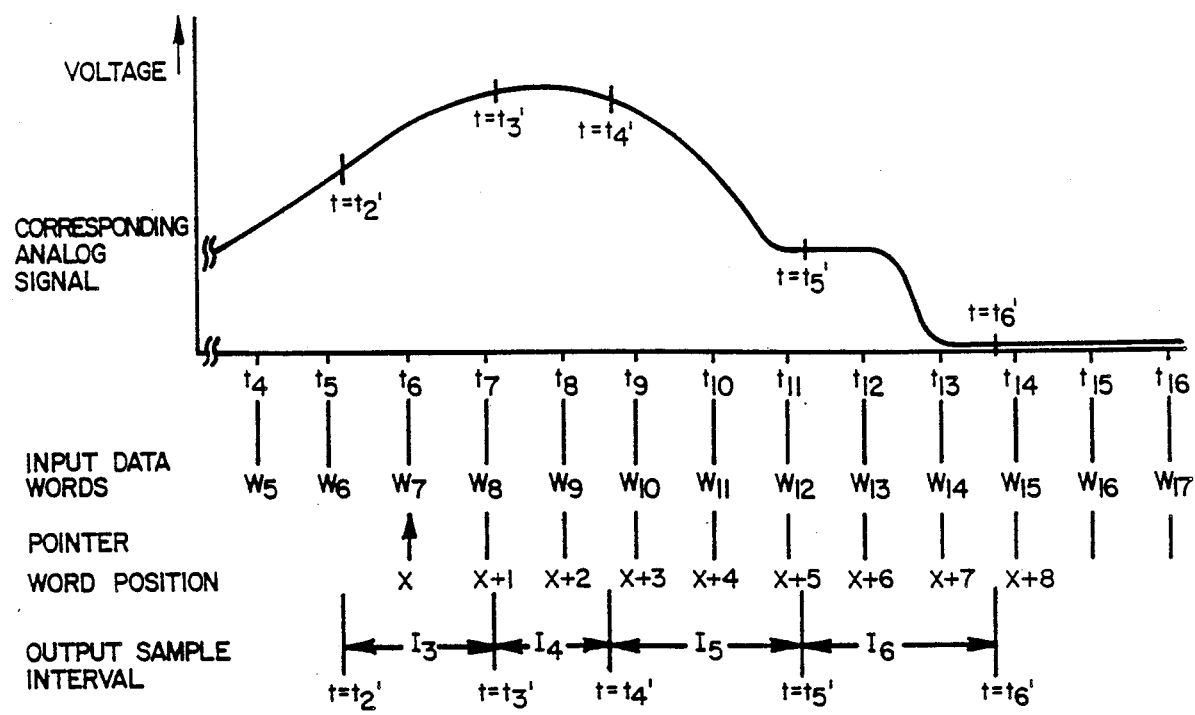
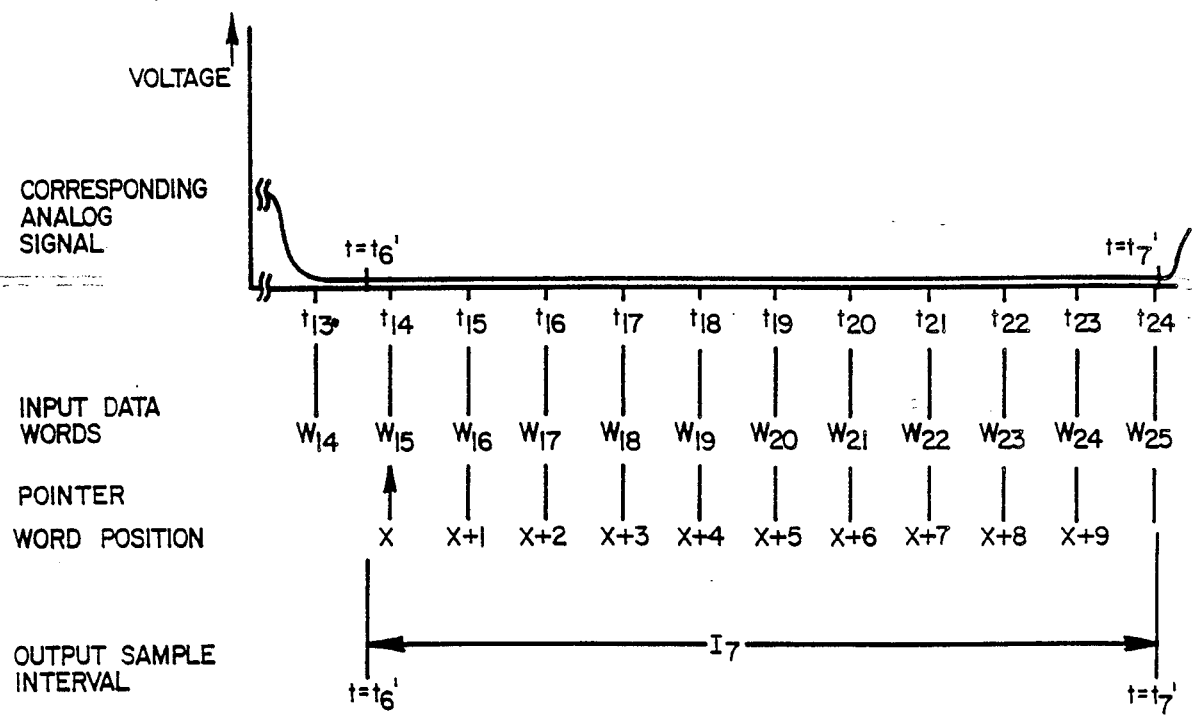

METHOD OF AND APPARATUS FOR CONVERTING DIGITAL DATA BETWEEN DATA FORMATS

This is a division of application Ser. No. 044,238, filed Apr. 30, 1987, now U.S. Pat. No. 4,816,829.

CROSS-REFERENCE TO RELATED APPLICATION

This application is related to Podolak et al U.S. patent application Ser. No. 941,205 filed Dec. 12, 1986, entitled "Digital Method and System for Reproducing Analog Data", assigned to the assignee of the instant application and the disclosure of which is hereby incorporated by reference.

TECHNICAL FIELD

The present invention relates generally to data encryption techniques, and more particularly to a method of and apparatus for converting digital data of one format into digital data of a second format.

BACKGROUND

Data encryption systems have been devised which are used to digitally reproduce an analog signal without substantial distortion or loss. Typically, such systems are based upon the Nyquist theorem which states that an analog bandwidth-limited signal can be reproduced exactly by sampling the signal at a rate at least twice the upper bandwidth limit of the signal to create a staircase approximation of the analog signal and by passing the staircase approximation through an ideal low-pass filter having a cutoff frequency equal to the upper bandwidth limit. In accordance with this theorem, prior systems have sampled an analog signal at a constant rate which is at least twice the highest anticipated frequency of the signal to create the staircase approximation. In the field of audio signal reproduction where the upper bandwidth limit is generally assumed to be 20 kilohertz, a sampling frequency of 44.1 kilohertz is utilized to encode the analog signal.

Such systems typically store the staircase approximation as a series of digital words on or in a storage medium, such an audio compact disc, a hard disk or an optical or video disc.

The analog signal is then reproduced by retrieving the digital words at a constant rate, converting the series of digital words into the staircase approximation of the analog signal by means of a D/A converter and by passing the staircase approximation through an ideal low-pass filter having a cut-off frequency equal to 20 kilohertz.

The foregoing technique for digitally reproducing an analog signal has been found to be disadvantageous in that a large amount of digital words are required to encode an analog signal of given duration.

Other types of systems for digitally reproducing an analog signal include Cherry et al U.S. Pat. No. 3,324,237, Kitamura et al U.S. Pat. No. 4,568,912, Cherry et al U.S. Pat. No. 3,299,204, Stapleton U.S. Pat. No. 3,449,742, Jordan U.S. Pat. No. 4,308,585, Kitamura U.S. Pat. No. 4,370,643 and Tsuchiya et al U.S. Pat. No. 4,348,699.

The Cherry et al '237 patent, in particular, discloses a television transmission system in which an analog video signal is sampled at a six megahertz rate to create a series of equally-spaced digital samples which are analyzed to derive a bandwidth associated with each sample. A predetermined number of samples defining a first portion of the video signal are then analyzed to determine whether the bandwidth associated with each sample is less than a particular frequency. If so, all but one of the predetermined number of samples are dropped and the last sample is retained. On the other hand, if less than all of the bandwidths associated with the samples are less than the particular frequency, then only some or none of the samples are dropped, with the remainder being retained. Further predetermined numbers of samples defining subsequent portions of the video signal are processed in a like way to develop a signal containing a number of unequally spaced samples which define the original video signal. This system, however, can only sample at frequencies which are an integer submultiple of the original six megahertz frequency, and hence resolution is limited and oversampling is bound to occur under usual circumstances.

A still further type of digital method and system for reproducing an analog signal is disclosed and claimed in the cross-referenced Podolak et al patent application identified above. This system detects the upper bandwidth limit of the analog signal to be reproduced, samples the analog input signal at a variable sampling rate determined in accordance with the detected upper bandwidth limit to define a sampled approximation of the input analog signal comprising a series of voltage levels and converts the sampled approximation into a series of digital signals or words each of which contains bits defining a voltage level and the sampling rate at which such voltage level was derived. These signals or words are then stored in a storage medium.

The analog signal is reproduced by decoding apparatus which sequentially retrieves the digital words from the storage medium, converts the digital words into the sampled approximation of the analog input signal by means of a D/A converter and filters the sampled approximation using a low-pass filter having a cut-off frequency determined in accordance with the encoded sampling rate of each word.

This system also encodes periods of silence during which the analog signal is at a substantially zero level as one or more digital words which together indicate the duration of such period, rather than encoding a substantially greater number of digital signals each of which represent a substantially zero voltage level for a portion of the silence period.

The foregoing system has been found to result in a substantial reduction in the amount of digital words required to encode an analog signal as compared with the prior art.

Moreover, it has been found that the foregoing system is also effective for use in those situations where no storage medium is utilized, such as when it is desired to transmit an audio signal in digital form over a communication medium.

A further example of a silence detection and encoding system is disclosed in IBM Technical Disclosure Bulletin, Vol. 20, No. 4, September 1977. When silence in an input signal is sensed, a counter is enabled to create a digital indication of the silence duration. The digital indication is stored with other digital signals representing nonsilence portions of the input signal.

SUMMARY OF THE INVENTION

In accordance with the present invention, there is disclosed a method of and apparatus for converting digital data encoded in one format into digital data encoded in a different format. The present invention is particularly adapted for use in converting between data formats wherein one of the data formats is a conventional data format normally utilized to digitally encode audio signals on compact discs and wherein the other format is the data format disclosed closed in the Podolak et al application identified above.

More specifically, there is disclosed herein a method of and apparatus for converting digital data encoded in a first format into digital data encoded in a second format wherein the data of the first format comprises a series of words representing a first staircase approximation of an analog signal whereby the staircase approximation includes a sequence of levels of equal duration. The data of the second format represents a second staircase approximation of the analog signal and has levels of unequal duration. A number of the words of the first format are analyzed to detect an upper bandwidth limit of the analog signal in an portion thereof represented by such words. The amplitude of the analog signal at the beginning of the portion is determined and a word of the second format is developed having a first plurality of bits encoded with a representation of the upper bandwidth limit and a second plurality of bits encoded with a representation of the amplitude of the analog signal at the beginning of the portion. This process is repeated for successive different portions of the analog signal as represented by different groups of words of the first format to derive the words of the second format.

There is also disclosed a method of and apparatus for converting words of the second format into words of the first format whereby each word of the second format is converted into a series of words of the first format.

The present invention is capable of compressing digital data encoded in a conventional format so that the amount of memory necessary to digitally represent an analog signal is reduced.

BRIEF DESCRIPTION OF THE DRAWINGS

FIGS. 3A-3D are a series of waveform diagrams illustrating the operation of the programming illustrated in FIGS. 2A and 2B.

DESCRIPTION OF THE PREFERRED EMBODIMENT

Figure 1:
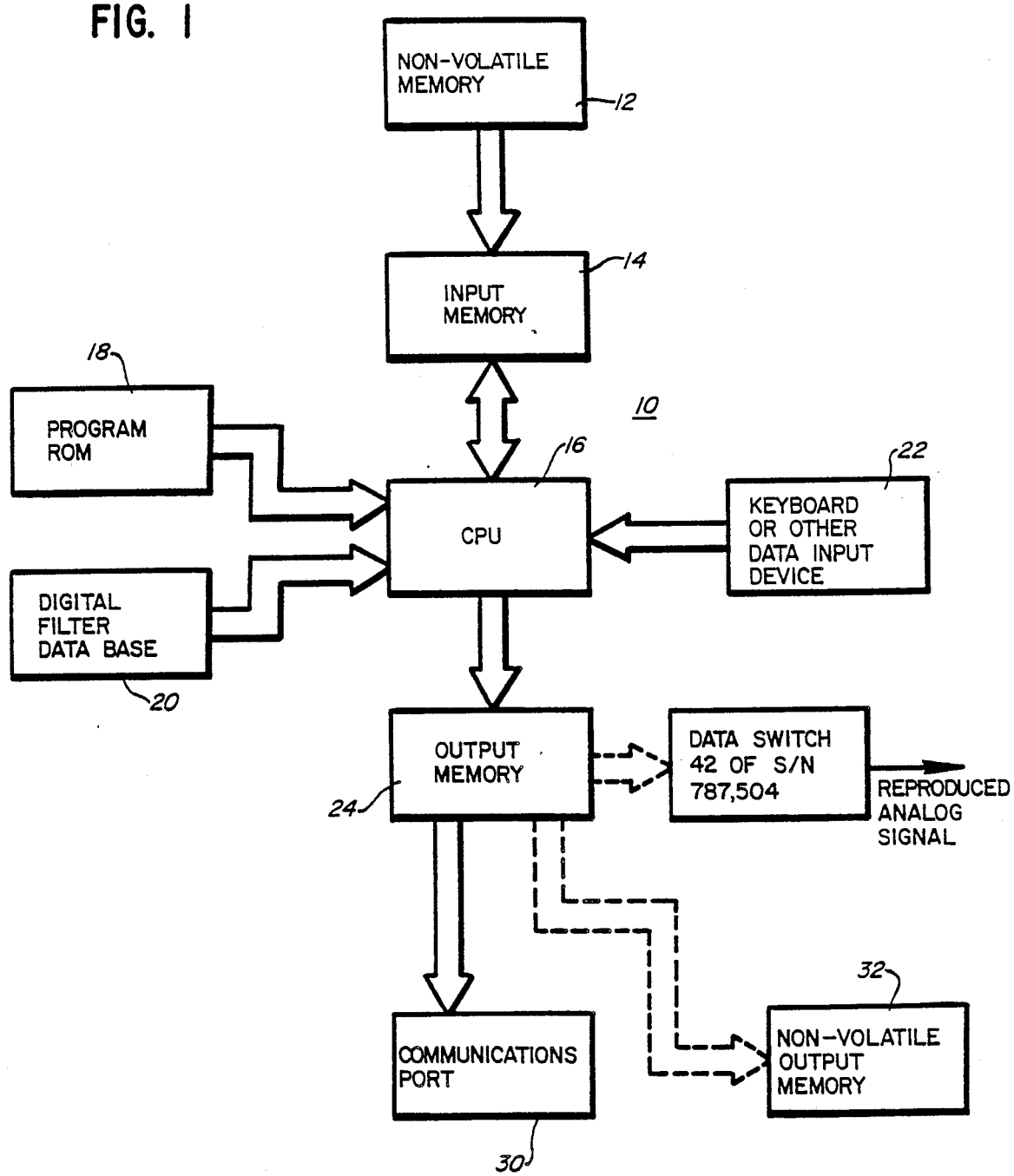
FIG. 1 is a block diagram of a system for converting digital data of one format into digital data of a second format.

Referring now to Fig. 1, there is illustrated in block diagram form a system 10 for converting digital data from one format to another. Specifically, the system 10 is particularly adapted to convert digital data representing a particular analog signal encoded in a first format by a conventional encryption process into digital signals or words encoded in a second data format as disclosed in copending application Ser. No. 941,205. The system 10 may also be modified as noted below to convert data of the second format into data of the first format.

The data of the first format comprises a first series of digital words which are stored in a nonvolatile memory 12, such as a compact disc, a hard disk or the like. The digital words together represent a stepwise or staircase approximation of the analog signal comprising a plurality of voltage levels of equal duration. Each word is 16 bits in length and is derived by sampling the analog signal at a 44.1 kilohertz rate.

The series of digital words in the nonvolatile memory 12 are transferred to an input memory 14 which may comprise, for example, a random access memory, or RAM.

It should be noted that the reading device for fetching and transferring the digital words from the memory 12 to the input memory 14 is not shown in FIG. 1 for purposes of clarity.

A central processing unit, or CPU 16 converts the digital words in the input memory 14 into digital data of the second format under control of a program stored in a read only memory, or ROM 18. The CPU 16 utilizes a series of digital filters which are implemented using a digital filter data base 20 which may also comprise a read only memory. A keyboard or other data input device 22 allows an operator to select cut-off values for the digital filters, if desired, and as noted more specifically below.

The digital words of the second format developed by the CPU 16 are stored in an output memory 24, which again may be a random access memory. The second format comprises a second series of digital words which together represent a second plurality of voltage levels of varying duration wherein the levels define a second or output stepwise or staircase approximation of the corresponding analog signal. The duration or output sample interval of each voltage level of the further staircase approximation is determined in accordance with the frequency of the corresponding analog signal, and more particularly the upper bandwidth limit of such signal. Each word includes a first plurality of bits which comprise an encoded representation of the voltage level and a second plurality of bits which define the duration of the voltage level.

Equivalently, the digital words encoded in the second data format may be thought of as defining an analog signal which has been sampled at a variable sampling rate, which rate is determined in accordance with the instantaneous upper bandwidth limit of the analog signal.

In the preferred embodiment, the duration of each level is equal to one of a set of N durational values, such values corresponding to N different sampling frequencies wherein the N sampling frequencies are at least equal to twice the detected upper bandwidth limit of the analog signal.

The digital words stored in the output memory 24 may be coupled to one or more of a plurality of output devices for transmitting, storing or reproducing the analog signal. For example, the words stored in the memory 24 may be read by an appropriate reading device (not shown) and coupled to the data switch 42 illustrated in FIG. 2B of application Ser. No. 787,504, in which case the corresponding analog signal is reproduced. Alternatively, the words in the memory 24 may be transferred to a communications port 30 for transmission over a communication medium to a remote location. Further, the words in the memory 24 may be transferred to a nonvolatile output memory 32, such as a compact disc, a hard disk, or the like.

Figure 2A:
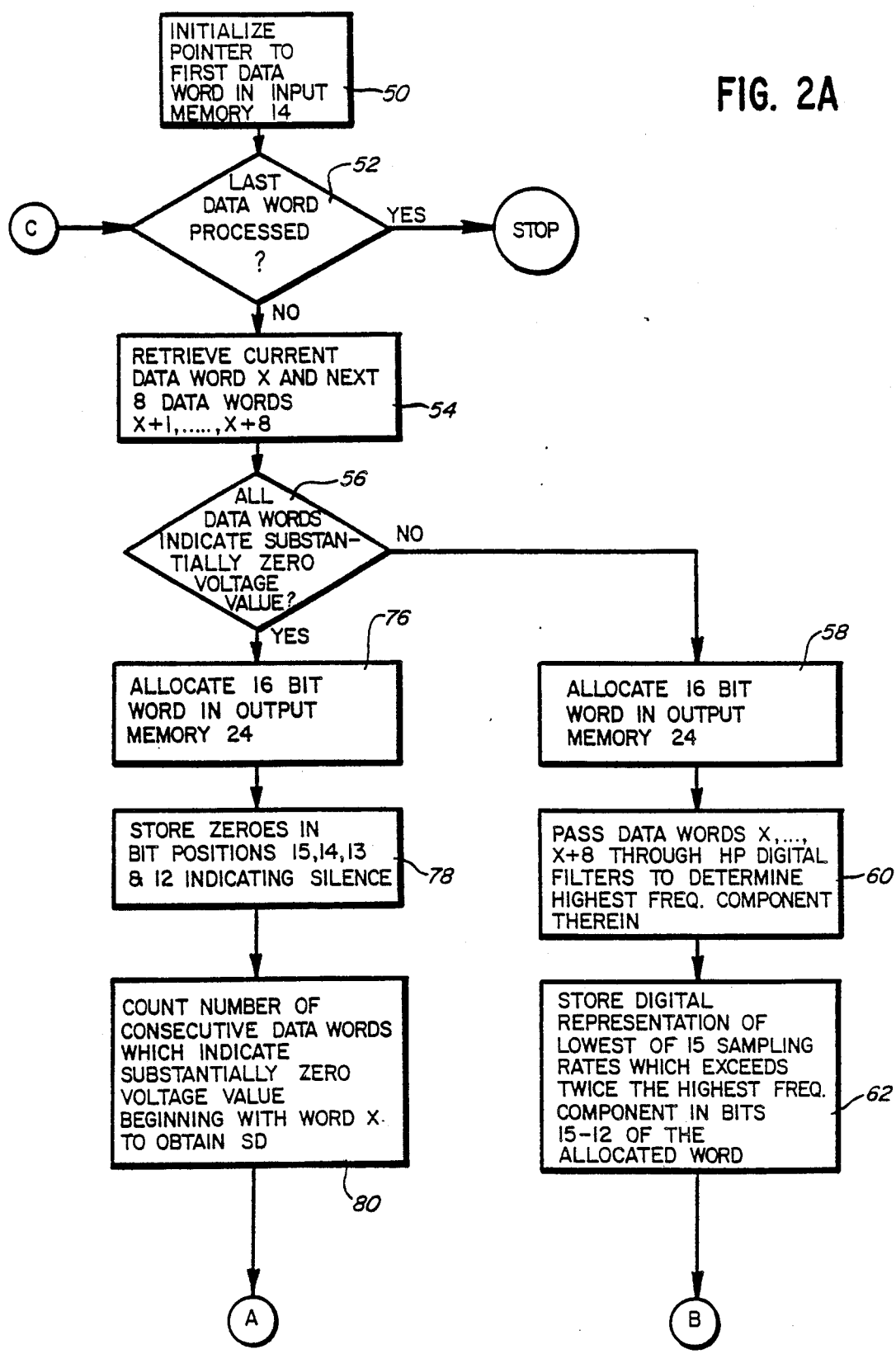
FIGS. 2A and 2B, when joined along similarly lettered lines, together comprise a flow chart of the programming stored in the program ROM illustrated in FIG. 1.
Figure 2B:
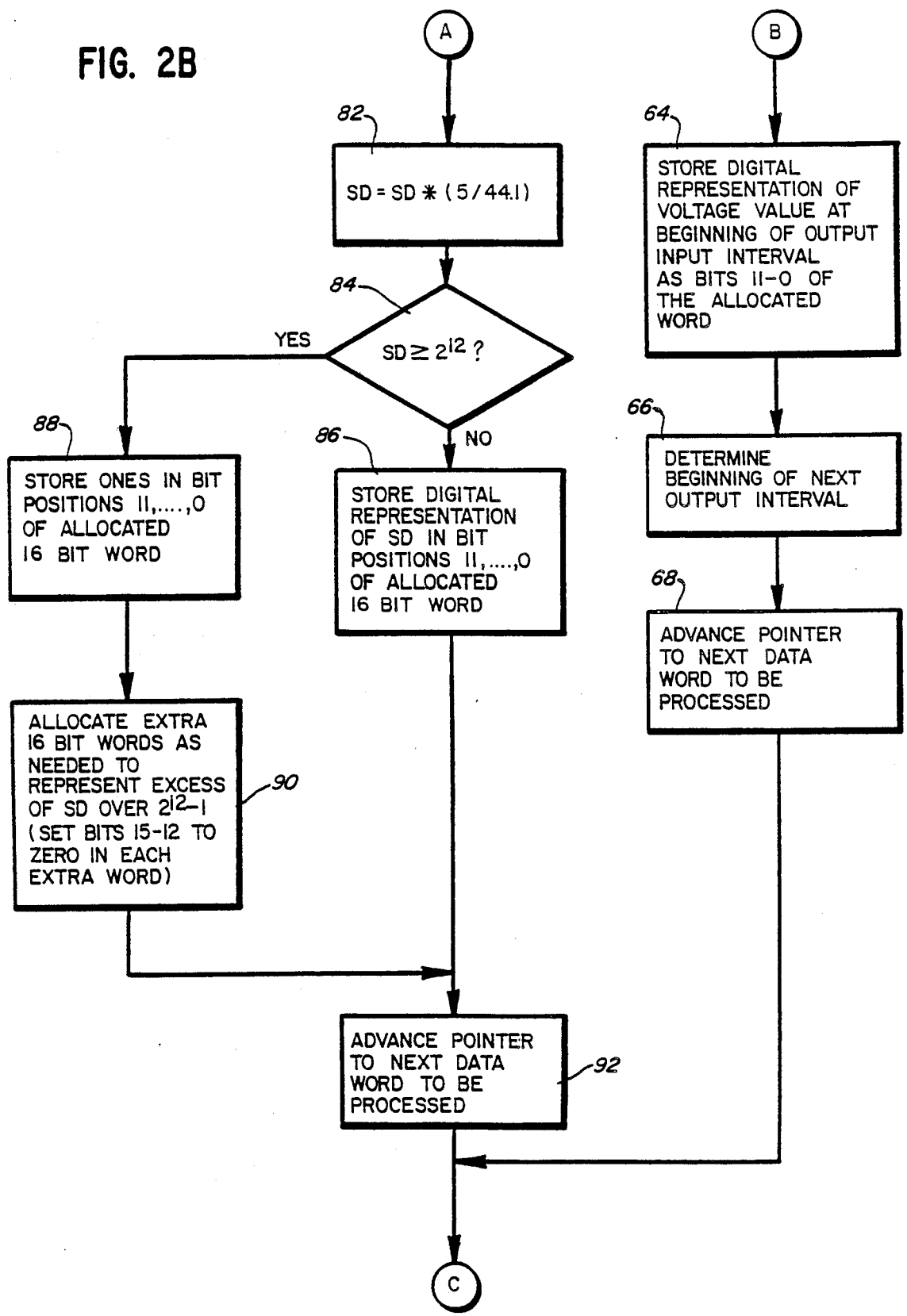

Referring now to FIGS. 2A and 2B, there is illustrated therein the programming stored in the program ROM 18 illustrated in FIG. 1. The CPU 16 sequentially accesses the words $W_i$ stored in the input memory 14, where i equals 1, 2, 3, . . . As seen in FIGS. 3A–3D, these words $W_i$ define a plurality of voltage levels of a first or input stepwise approximation 40 of a corresponding analog signal 42. As noted previously, the levels of the approximation 40 are of equal length and result from sampling at a 44.1 kilohertz clock rate.

Figure 3A:
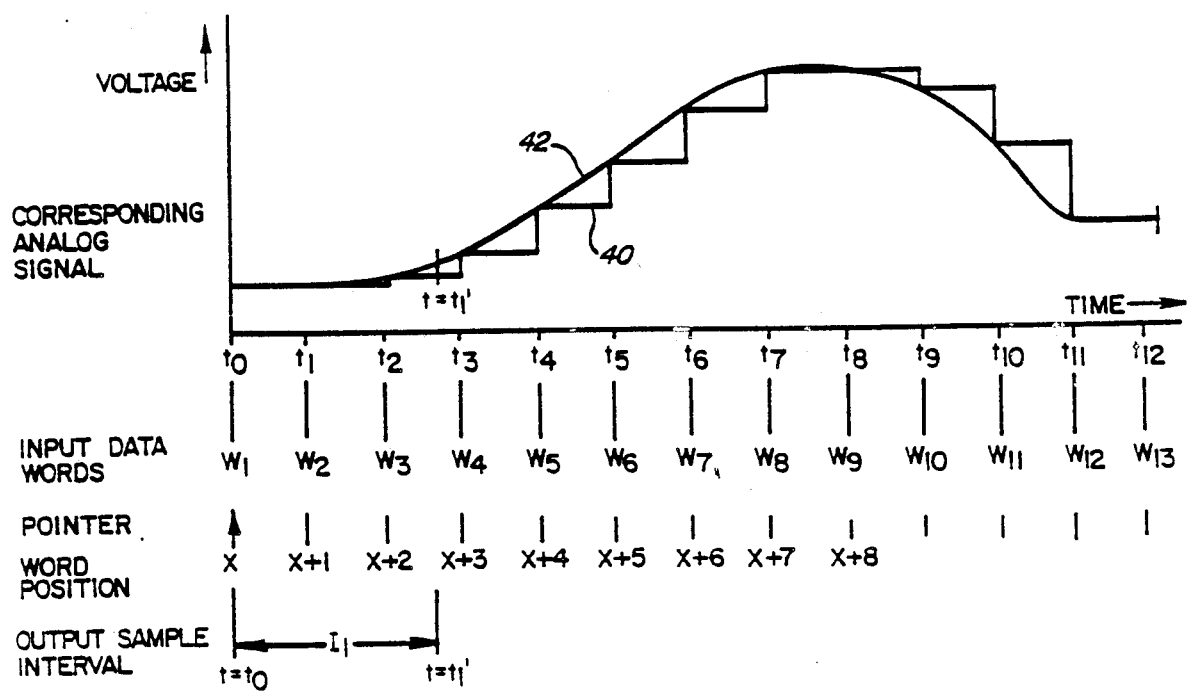

Referring specifically to FIGS. 2A and 3A, the program begins at a block 50 which initializes a pointer to the first data word $W_1$ in the input memory 14. As seen in FIG. 3A, the pointer defines a variable X which indicates the current position of the pointer. The variable X is also used to determine a "look-ahead" interval defined by the word at position X in the memory and the data words in the memory 14 which define the eight consecutive successive steps in the first stepwise approximation 40 following the step defined by the word at position X. This look-ahead interval is used to determine the lengths of the voltage levels defined by the digital words of the second data format, as noted more specifically below.

It should be noted that the look-ahead interval must be at least as long as the greatest durational value of the set of N durational values.

Following the block 50, a block 52 checks to determine whether the last data word in the input memory 14 has been processed. If so, then all of the data in the input memory 14 has been converted into digital data of the second format and hence the program is terminated.

On the other hand, if the last data word has not been processed, control passes to a block 54 which retrieves the current data word at position X and the next eight data words at positions X+1, X+2, . . . X+8 from the memory 14. In the example shown in FIG. 3A, the words $W_1$–$W_9$ are retrieved and are analyzed by a block 56 which checks to determine whether these words all indicate a substantially zero voltage value in the corresponding analog signal 42 for an interval extending from time t=$t_0$ to time t=$t_9$. For the example shown in FIG. 3A, the corresponding analog signal 42 is not at a substantially zero value throughout this period of time, and hence control passes to a block 58 which allocates a 16 bit space in the output memory 24 in which will be stored a digital word $W_{OUT1}$ of the second format.

A block 60 then accesses the digital filter data base 20, FIG. 1, and passes the digital data words at positions X, X+1, . . . X+8 through a plurality of high-pass digital filters so as to determine the range in which the highest frequency component of the corresponding analog signal 42 lies for the period of time t=$t_0$ through t=$t_9$. In the preferred embodiment, the digital words are passed through 14 high-pass digital filters having cut-off frequencies $f_{c1}$–$f_{c14}$ which are spaced throughout the anticipated frequency spectrum of the analog signal 42. When the analog signal to be reproduced comprises an audio signal, the cut-off frequencies $f_{c1}$–$f_{c14}$ may be established at 1 kilohertz, 2 kilohertz, 3 kilohertz, 4 kilohertz, 5 kilohertz, 6.6 kilohertz, 8 kilohertz, 9 kilohertz, 10 kilohertz, 11.5 kilohertz, 13 kilohertz, 14.5 kilohertz, 16 kilohertz and 18 kilohertz. During this process, the CPU determines which of the fourteen high-pass filters generate an output and develops a signal $f_n$ representing the range of the upper bandwidth limit. This range signal identifies the cut-off frequency of the highest-frequency high-pass filter which developed an output. For example, when the highest frequency in the look-ahead interval is 8.5 kilohertz, the signal $f_n$ identifies the 8 kilohertz high-pass filter as being the highest-frequency filter which generate an output when the 9 words at positions X, X+1, X+2 . . . X+8 are passed through the filters. The signal $f_n$ therefore designates the range of the upper bandwidth limit of the look-ahead interval as being between 8 kilohertz and 9 kilohertz.

It should be noted that the signal $f_n$ is capable of assuming one of 15 values, i.e. the 14 values equal to $f_{c1}$–$f_{c14}$ and a fifteenth value equal to zero which denotes that the highest frequency in the look-ahead interval is less than 1 kilohertz.

Once the block 60 has determined the range of the highest frequency component of the analog signal in the look-ahead interval, a block 62 stores a digital representation of the lowest of 15 sampling rates which exceeds at least twice the upper limit of the range of the highest frequency component in bit positions 15–12 of the allocated 16 bit word in the output memory 24. These sampling rates are predetermined in accordance with the following equation:

$$f_s = 2.5 \times f_{BW}$$

where $f_s$ is the sampling rate and $f_{BW}$ equals one of $f_0$–$f_{14}$ as determined by the following:

$f_{BW} = f_0$ if $f_n < f_0$ $f_{BW} = f_1$ if $f_0 \leq f_n < f_1$ $f_{BW} = f_2$ if $f_1 \leq f_n < f_2$ $f_{BW} = f_3$ if $f_2 \leq f_n < f_3$ $f_{BW} = f_4$ if $f_3 \leq f_n < f_4$ $f_{BW} = f_5$ if $f_4 \leq f_n < f_5$ $f_{BW} = f_6$ if $f_5 \leq f_n < f_6$ $f_{BW} = f_7$ if $f_6 \leq f_n < f_7$ $f_{BW} = f_8$ if $f_7 \leq f_n < f_8$ $f_{BW} = f_9$ if $f_8 \leq f_n < f_9$ $f_{BW} = f_{10}$ if $f_9 \leq f_n < f_{10}$ $f_{BW} = f_{11}$ if $f_{10} \leq f_n < f_{11}$ $f_{BW} = f_{12}$ if $f_{11} \leq f_n < f_{12}$ $f_{BW} = f_{13}$ if $f_{12} \leq f_n < f_{13}$ $f_{BW} = f_{14}$ if $f_{13} \leq f_n$ In the preferred embodiment, the following values are used for $f_0$ through $f_{14}$.

$f_0$ = 1 kilohertz
$f_1$ = 2 kilohertz
$f_2$ = 3 kilohertz
$f_3$ = 4 kilohertz
$f_4$ = 5 kilohertz
$f_5$ = 6.6 kilohertz
$f_6$ = 8 kilohertz
$f_7$ = 9 kilohertz
$f_8$ = 10 kilohertz $f_9 = 11.5$ kilohertz
$f_{10} = 13$ kilohertz
$f_{11} = 14.5$ kilohertz
$f_{12} = 16$ kilohertz
$f_{13} = 18$ kilohertz
$f_{14} = 20$ kilohertz In the example noted above where the signal $f_n$ equals 8 kilohertz, the value $f_{BW} = 9$ kilohertz and hence the sampling frequency $f_s = 2.5 \times (9 \text{ kilohertz}) = 22.5$ kilohertz.

Once the block 62 determines and encodes the sampling rate, control passes to a block 64 which determines the initial value of the corresponding analog signal at the beginning of the first output sample interval at time $t_0$ and develops a 12 bit representation of this value which is stored in bit positions 11–0 of the allocated 16 bit word $W_{OUT1}$ in the output memory 24. In the example illustrated in FIG. 3A, the beginning of this output sample interval to be represented by the word $W_{OUT1}$ in the output memory is coincident with the value of the analog signal represented by the 16 bit input data word $W_1$. Therefore, in this case the block 64 need only convert the 16 bit representation into a 12 bit representation which is concatenated with the four-bit representation of the sampling rate to form the word $W_{OUT1}$ which is stored in the memory 24. However, it may occur that the beginning of the output sample interval represented by the word to be stored in the output memory 24 does not conveniently lie at a point defined by one of the words $W_i$ in the input memory 14. In this case, it is necessary to determine the voltage level of the corresponding analog signal 42 at the beginning of this output sample interval by convolution, as noted more specifically below.

Following the block 64, a block 66 calculates the length of the output sample interval represented by the word $W_{OUT1}$ stored in the output memory 24. This interval in turn determines the beginning of the next output sample interval and is calculated using the encoded sampling rate in the output word $W_{OUT1}$ as follows:

$I_D = 1/f_s$ where $D = 1, 2, 3 \ldots$

For example, as seen in FIG. 3A, the first output sample interval $I_1$ extends from time $t = t_0$ to time $t = t_{1'}$ where $t_{1'}$ falls between times $t_2$ and $t_3$. This length of time is determined by the period of the sampling frequency $f_s$ established by the block 62, FIG. 2A. The word $W_{OUT1}$ therefore represents a first step of the second staircase approximation of the corresponding analog signal 42.

Figure 3B:
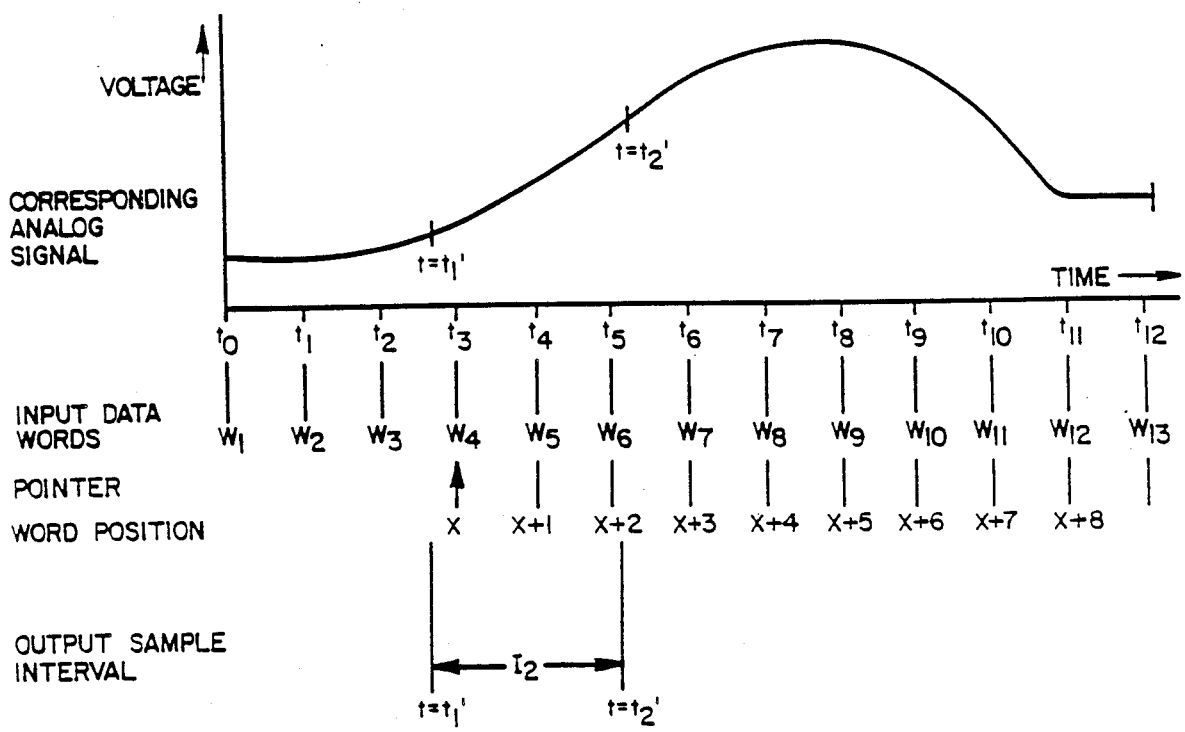

Following the block 66, a block 68 advances the pointer to the next input data word $W_i$ to be processed. The pointer is advanced by a number of input word positions Y, where Y is the number of input word positions in the memory 14 from the word at position X to the input word that defines the first point of the corresponding analog signal at or subsequent to the beginning of the second or next output sample interval. In the example as shown in FIG. 3B, the pointer is moved to the word $W_4$ which is the word defining the level of the input staircase approximation 40 between the times $t_3$ and $t_4$.

Following the block 68, control returns to the block 52 which initiates derivation of a second word $W_{OUT2}$ of the second data format and determination of the beginning of a third output interval beginning at time $t = t_{2'}$ between the times $t = t_5$ and $t = t_6$.

More particularly, during the second pass through the program illustrated in FIGS. 2A and 2B, the words $W_4$–$W_{12}$ are analyzed by the block 56 and are determined not to represent a substantially zero voltage value throughout the time interval $t = t_3$ through $t = t_{11}$. Accordingly, a 16 bit word is allocated in the output memory 24 and the data words $W_4$–$W_{12}$ are passed through the high-pass digital filters to determine the highest frequency component therein. The sampling rate $f_s$ is determined from the highest frequency component by the block 62 and an encoded representation of such sampling rate is stored in bit positions 15–12 of the allocated word $W_{OUT2}$. The block 64 then determines the digital representation of the voltage value at the beginning of the second output sample interval $I_2$. This is accomplished by convolution using the data words $W_4$–$W_6$ between the times $t = t_{1'}$ and $t = t_{2'}$. In practice, this is equivalent to passing the data words through a digital low-pass filter so as to reconstruct a portion of the original analog signal. The digital low-pass filter is implemented using the digital filter data base 20. The cut-off frequency of the low-pass filter is selected to be equal to the value $f_{BW}$ determined by the block 60.

Once the foregoing is accomplished, the block 64 stores a digital representation of the voltage level at the time $t = t_{1'}$ as bits 11–0 of the second output data word $W_{OUT2}$. The second output data word $W_{OUT2}$ therefore represents a second step of the output staircase approximation of the corresponding analog signal.

In similar fashion and as seen in FIG. 3C, a third digital word $W_{OUT3}$ of the second format is developed to define the analog signal in an output sample interval $I_3$ between the times $t_{2'}$ and $t_{3'}$. This digital word is developed after moving the pointer to the word $W_7$ which is the first input word defining a point of the corresponding analog signal subsequent to the time $t = t_{2'}$ in the analog signal. The words $W_7$–$W_{15}$ then comprise the look-ahead interval which is used to determine the third output data word defining a third step of the output staircase approximation in the output sample interval $I_3$.

In like fashion, fourth, fifth and sixth digital words $W_{OUT4}$–$W_{OUT6}$ are developed representing the analog signal in output sample intervals $I_4$–$I_6$ beginning with times $t_{3'}$, $t_{4'}$ and $t_{5'}$.

Referring now to FIG. 3D, assume that at time $t_{13}$, the corresponding analog signal drops to substantially zero voltage until time $t_{24}$. The input words $W_{14}$–$W_{24}$ representing the analog signal in this portion are all therefore substantially zero. Once the pointer has been moved to the digital word $W_{15}$, which is the first input word representing the analog signal following the end of the preceding output sample interval $I_6$, the words $W_{15}$–$W_{23}$ are analyzed by the block 56 and control passes therefrom to a block 76 which allocates a 16 bit word in the output memory 24. A block 78 stores zeroes in bit positions 15–12 of the 16 bit word in the memory 24. This coding in these bit positions indicates that silence is to be reproduced in an output sample interval $I_7$.

A block 80 then analyzes the words following the word $W_{23}$ to determine the number of additional consecutive input words which indicate substantially zero value in the corresponding analog signal. In the example illustrated in FIG. 3D, there is one additional word $W_{24}$ which defines an interval of substantially zero level. A value for a variable SD (denoting silence duration) is thereby obtained and is initially defined as the number of consecutive input data words which indicate substantially zero voltage value beginning with the word X.

A block 82 then multiplies the variable SD by a factor of 5/44.1 which represents the ratio of the lowest sampling frequency encoded in the output digital words to the constant sampling frequency used to derive the input words. This converts the variable SD to a value representing the length of time the analog signal is at substantially zero voltage.

A block 84 then checks to determine whether the variable SD is greater than or equal to a value which can be represented by 12 bits in an output word. If this is not the case, a digital representation of the variable SD is stored in bit positions 11-0 of the allocated 16 bit word in the output memory 24. On the other hand, if the variable SD is greater than that which can be represented by 12 bits, a block 88 stores a series of ones in bit positions 11-0 of the allocated 16 bit word and a block 90 allocates extra 16 bit words as needed to represent the excess of SD over the value which can be represented by the 12 bits of the first word. In this case, each of the words which represents the duration of silence includes bit positions 15-12 having zeroes stored therein.

A block 92 then advances the pointer to the next data word to be processed. In the example shown in FIG. 3D, the pointer is moved to the input word following the last word representing a substantially zero level, i.e. the pointer is moved to the word $W_{25}$.

The foregoing conversion process continues until the last data word in the input memory has been processed. It should be noted that there will be a time when less than 9 data words remain in the memory 14 to be processed. In this case, the block 54 retrieves the available remaining data words in the memory 14 and assumes that the number of additional data words required to bring the total up to 9 words contain zeroes in all bit positions.

The foregoing conversion process results in a substantial reduction in the number of digital words required to represent a given portion of an analog signal.

It should be noted that the foregoing conversion process may also be used to compress digital data that does not represent an actual corresponding analog signal. For example, digital words of equal length (i.e. all having the same number of bits) stored in a memory may represent data unrelated to an analog signal. However, if the data is processed using the program illustrated in FIGS. 2A and 2B in a particular sequence, the upper limit of the "bandwidth" of the data can be detected to permit a reduction in the number of digital words to represent the data. In this case, the encoded representation of the "upper bandwidth limit" is concatenated with a digital word having the same number of bits as each of the original input words to form an output word wherein each output word represents the level of a step of an approximation of a corresponding analog signal at the beginning of an output interval and the duration of such step.

Figure 4:
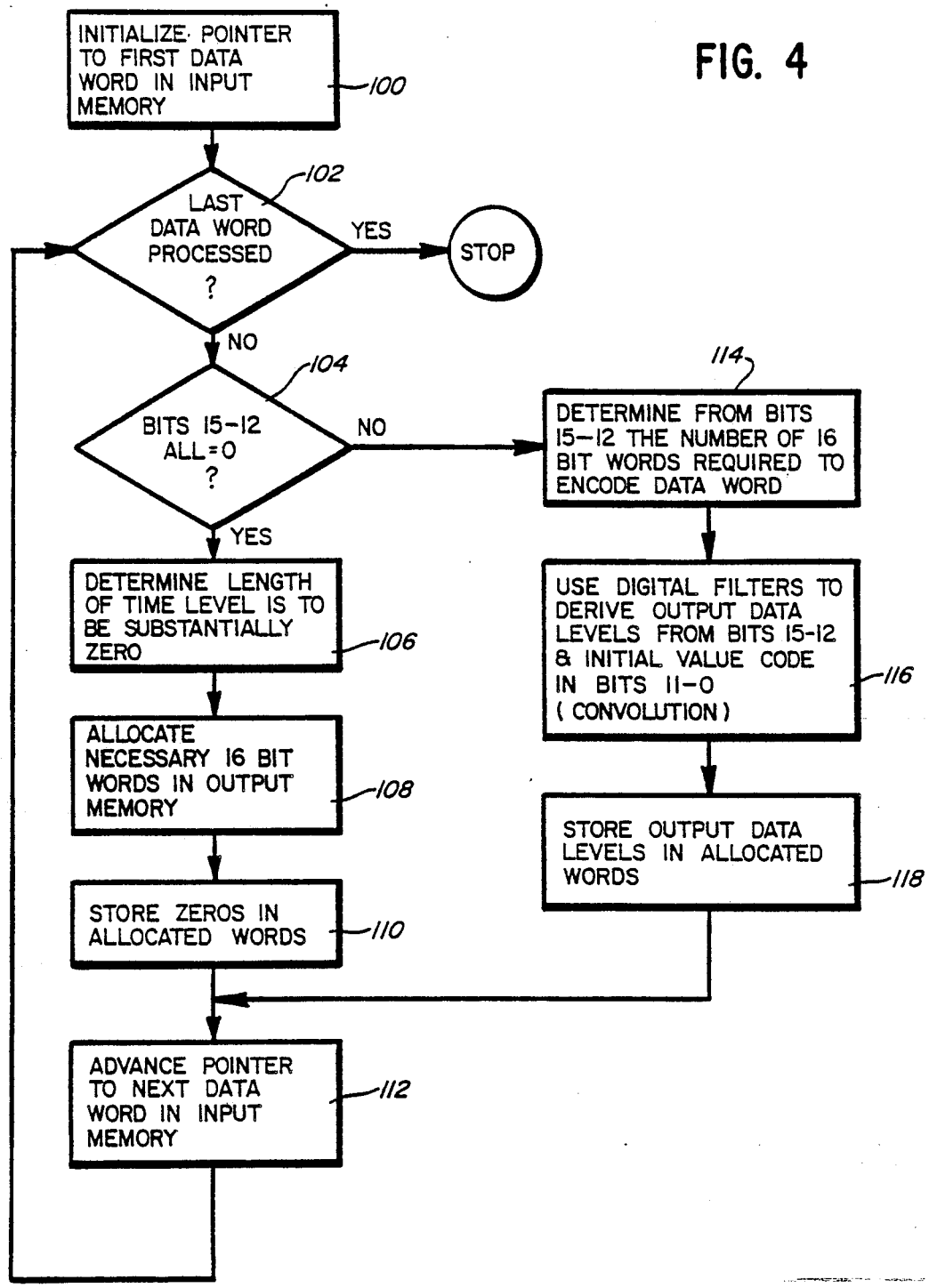
FIG. 4 comprises a flow chart of programming which may be stored in the program ROM illustrated in FIG. 1 to implement an alternative embodiment of the invention.

Referring now to FIG. 4, there is illustrated a program which may be stored in the ROM 18 of FIG. 1 to convert the digital words encoded in the second format into data of the first format. In this case, the words of the second format are loaded into the input memory 14 and the words of the first format are derived by the CPU 16 and loaded into the output memory 24.

The process begins at a block 100 which initializes a pointer to the first data word in the input memory. As is evident from the foregoing description, this data word is of the second format wherein a first plurality of bits represent the length of the interval defined by the word and a second plurality of bits represent the level at the beginning of this interval. A block 102 then checks to determine whether the last data word has been processed. If so, the process is terminated. If not, control passes to a block 104 which determines whether the first plurality of bits are all equal to zero. If this is the case, then it has been determined that a substantially zero voltage level must be encoded and a block 106 determines the length of time such level is to be reproduced. This is accomplished by analyzing the number stored in bit positions 11-0 of the data word. If all the bits in bit positions 11-0 are equal to one, successive input data words are checked to determine whether they also represent the duration of a period of substantially zero voltage level. Once the total duration of this period has been determined, the necessary 16 bit words are allocated in the output memory and a block 110 then stores zeroes in the bit positions of the allocated words. A block 112 then advances the pointer to the next data word in the input memory and control returns to the block 102.

If the block 104 determines that the first plurality of bits are not all equal to zero, a block 114 determines from such bits the number of 16 bit word positions required in the output memory to encode the information represented by the input data word. This is determined by multiplying the reciprocal of the sample frequency represented by these bits by 44.1 kilohertz.

A block 116 then reconstructs the corresponding analog signal by convolution of the initial value contained in the input data word with the impulse response of the filter. As a practical matter, this is accomplished utilizing the digital filters afforded by the digital filter data base 20 to derive output data levels from the first and second bits which together form the input word.

A block 118 then stores the derived output data levels in the allocated word positions in the output memory 24. Control then passes to the block 112 which advances the pointer to the next data word in the input memory.

The words of the first format stored in the output memory may thereafter be transferred to other storage media or may be sent over a communication media, as desired.

We claim:

1. A method of converting digital data encoded in one format into digital data encoded in a different format wherein the data of the one format comprises a series of words each having a first plurality of bits defining the amplitude of an analog signal at the beginning of an interval thereof and a second plurality of bits defining the length of the interval and wherein the data of the different format comprises a further series of words representing the amplitude of the analog signal at the beginning of further intervals thereof whereby the further intervals are of equal duration, comprising the steps of:

(a) selecting a word of the one format;
   (b) analyzing the second plurality of bits of the selected word to determine the number of further intervals contained in the interval represented by the selected word;

(c) utilizing the first plurality of bits of the selected word to determine the amplitude of the analog signal at the beginning of each further interval;

(d) encoding a number of words of the different format, each word representing an amplitude determined in step (c);

(e) selecting a further word of the one format; and (f) repeating steps (b)–(e) to derive the data of the different format.

2. The method of claim 1, wherein the step (c) includes the step of performing convolution on the selected word to reconstruct a portion of the analog signal and determining from the reconstructed analog signal the amplitudes thereof at the beginning of each further interval.

3. The method of claim 1, including the further steps of determining from the second plurality of bits whether the analog signal is at a substantially zero level and determining from the first plurality of bits the length of time the analog signal is at the zero level.

4. The method of claim 3, including the further step of encoding a number of words of the different format with an indication that the analog signal is at a substantially zero level during the time defined by the selected word.

* * * * *